United States Patent [19]

Calvignac et al.

[11] Patent Number: 4,491,913
[45] Date of Patent: Jan. 1, 1985

[54] ADDRESS GENERATING DEVICE FOR A COMMUNICATION LINE SCANNING DEVICE

[75] Inventors: Jean Calvignac, LaGaude; Yves Granger; Andre Masclet, both of Antibes, all of France

[73] Assignee: International Business Machines Corporation, Armonk, N.Y.

[21] Appl. No.: 433,744

[22] Filed: Oct. 12, 1982

[30] Foreign Application Priority Data

Oct. 28, 1981 [EP] 10281981 .......................... 81430038.0

[51] Int. Cl.³ ............................................. G06F 1/00
[52] U.S. Cl. ..................................................... 364/200
[58] Field of Search .......................... 364/200 MS File

[56] References Cited

U.S. PATENT DOCUMENTS 4,336,588 6/1982 Vernon et al. ....................... 364/200

OTHER PUBLICATIONS

D. Sellier "Fully Programmable Scanner" vol. 23, No. 6, Nov. 1980 pp. 2323-2324—IBM Technical Disclosure Bulletin.
S. Meguro "Automatic Module Detection" vol. 22, No. 10, Mar. 1980 pp. 4615-4616—IBM Technical Disclosure Bulletin.

Primary Examiner—Raulfe B. Zache
Attorney, Agent, or Firm—John B. Frisone

[57] ABSTRACT

The address generating device is provided for a communication line scanning device. The lines are connected to the scanning device through n line interface circuits, n varying in accordance with the network configuration. Each interface circuit can be connected to a various number of lines, for instance one line or k lines in a preferred embodiment, and comprises means for providing to the address generating device, a presence indicating signal indicating that it is plugged and a signal indicating the number of the lines connected thereto. A first logic circuit receives the presence indicating signals as inputs and generates on its outputs the address bits of the last present interface circuit to be scanned. A first counter able to count in binary mode up to n−1 is incremented by an increment pulse provided by a clock on each period assigned to the scanning of a line. This counter outputs the address bits of the successive interface circuits. A comparator compares the address bits so generated and the address bits of the last present interface circuit to be scanned and outputs a reset signal when these bits are equal.

9 Claims, 10 Drawing Figures

ADDRESS GENERATING DEVICE FOR A COMMUNICATION LINE SCANNING DEVICE

BACKGROUND OF THE INVENTION

This invention relates to a communication line scanning device provided, for instance, for a communication controller and more particularly, to an address generating device to be used in a scanning device for scanning a variable number of lines on which data are transmitted at different rates.

Communication controllers are provided to be included in data teleprocessing systems, in order to manage the transmissions performed on the various lines connected thereto. In general, the main control of the teleprocessing network is concentrated in one or several central processing units (CPU) containing a directory of the rules applied for processing data issued from or directed to the terminal units or terminals of the teleprocessing network. Sending and receiving data through communication lines are managed by communication controllers depending on the central processing unit(s). But in addition to the execution of actual transmission controls, the controller is also in charge of executing the directory functions, in particular the functions directly relating to the standard transmission procedures. Due to this fact, the central processing units are exempted from carrying out the corresponding tasks and can be used for executing other works.

The communication controller consists in a sophisticated assembly provided with an intelligence mainly concentrated in one or several central control units (CCU). The central control units are connected, on the one hand, to the terminals through line adapters and, on the other hand, to the central processing units through channel adapters so called because they are connected to the channels of the central processing unit(s).

The line adapters can serve a certain number of lines by means of a cyclic scanning device and a random access memory assembly temporarily containing the data received or to be sent on the various lines as controlled by the scanning device.

In such an environment, each line adapter can be connected to a variable number of lines exchanging information with terminals of various types and therefore, the protocols and the transmission rates of the data on these lines, are different. In order to have a data communication network exhibiting a maximum flexibility, it is necessary to use the same scanning device in the line adapters whatever the number of lines to be scanned and whatever protocols and transmission rates are used on these lines.

The scanning device includes a line address generating device allowing the communication lines to be successively addressed to cause the communication controller to receive or to send a bit of the message on each scanning period assigned to the line.

The transmission rate on the various lines is not the same due to fact that the communication controller can manage lines at very high speed or at low speed and the frequency at which the lines should be scanned is not the same for all the lines. Consequently, the line address generating unit should be able to be adapted in function of the configuration of the lines to be scanned.

PRIOR ART

In the communication controllers of the IBM 3705 type, the adjustment of the line scanning frequency is program-controlled. Therefore, the arrangement of the lines connected to the controller cannot be readily modified.

It is the same in the system described in patent No. FR-A-1,584,680 in which parameters controlling the scanning of a group of lines exhibiting the same speed characteristics, are written in a control storage.

Therefore, an object of this invention is to provide a line address generating device which can be automatically adapted to the configuration of the lines managed by the scanning device.

SUMMARY OF THE INVENTION

This invention relates to an address generating device provided for a communication line scanning device, message bits being exchanged on said communication lines. The lines are connected to the scanning device through n line interface circuits, n varying in accordance with the network configuration. Each interface circuit can be connected to a various number of lines, for instance one line or k lines in a preferred embodiment, and comprises means for providing to the address generating device, a presence indicating signal indicating that it is plugged and a signal indicating the number of the lines connected thereto. A first logic circuit receives the presence indicating signals as inputs and generates on its outputs the address bits of the last present interface circuit to be scanned. A first counter able to count in binary mode up to n-1 is incremented by an increment pulse provided by a clock on each period assigned to the scanning of a line. This counter outputs the address bits of the successive interface circuits. A comparator compares the address bits so generated and the address bits of the last present interface circuit to be scanned and outputs a reset signal when these bits are equal. This reset signal is applied to the first counter which is reset to 0 when the last interface circuit has been scanned.

A second logic circuit receives the address bits generated by the counter and the signals indicating the number of lines, to generate an output signal which is active to indicate the number of the lines of the circuit which is connected to the interface circuit addressed by the first counter.

A second counter able to count up to k-1 is incremented by the reset signal provided by the comparator to output line address bits which, with the interface address bits, constitute the line address information on the outputs of the address generator. Inhibiting means are provided to cause the address bits provided by the second counter to be modified on the outputs of the address generator when the line interface circuit is not connected to the maximum number of lines k.

DETAILED DESCRIPTION OF THE INVENTION

Figure 1:
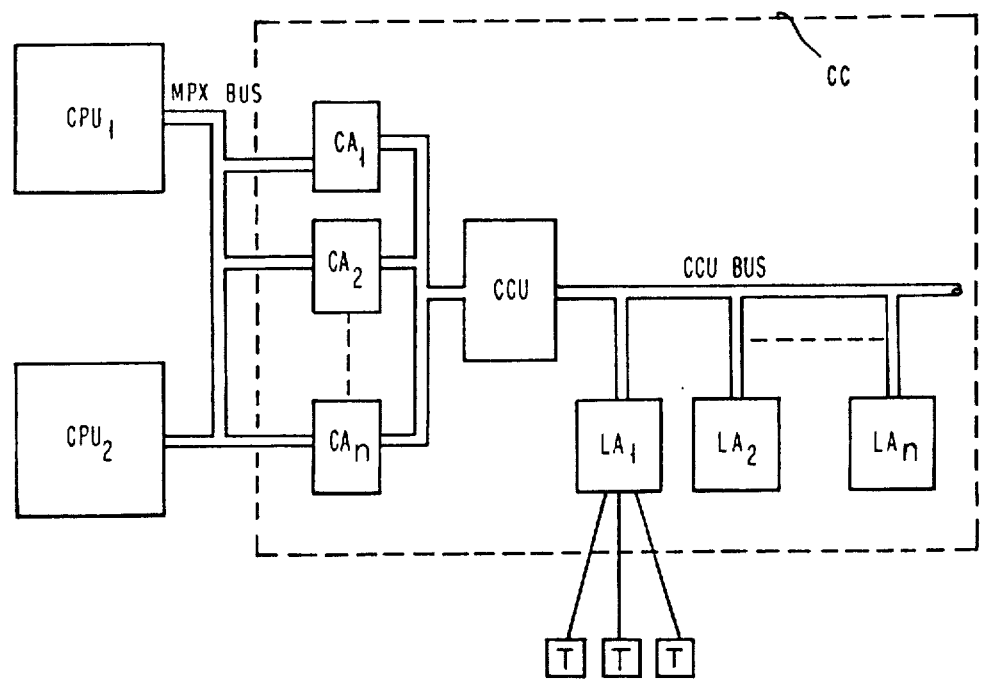
FIG. 1 is a schematic view of a communication controller in which this invention can be implemented.

The general scheme of a system in which the present invention can be implemented will be described in the following as an example, while referring to FIG. 1. Communication controller CC is an element of a teleprocessing network, an example of which is more particularly described in chapter 10 of the book entitled: "Teleinformatique" of G. Macchi and J. E. Guilbert. In the communication controller, the central control unit manages the data transmitted between terminals T and central processing units CPU1 and CPU2. The CCU unit is connected to multiplex channels MPX BUS of central processing units CPU1 and CPU2 through channel adapters CA1, . . . , CAn. It is also connected to terminals T through line adapters LA1, . . . , LAn connected to a bus CCU BUS.

In such an environment, this invention is to be incorporated in a line scanning device provided for line adapters, said device being modular, that is to say that the same device can be used whatever number of lines is provided, whatever protocols and transmission rates are used on the lines connected thereto.

Figure 2:
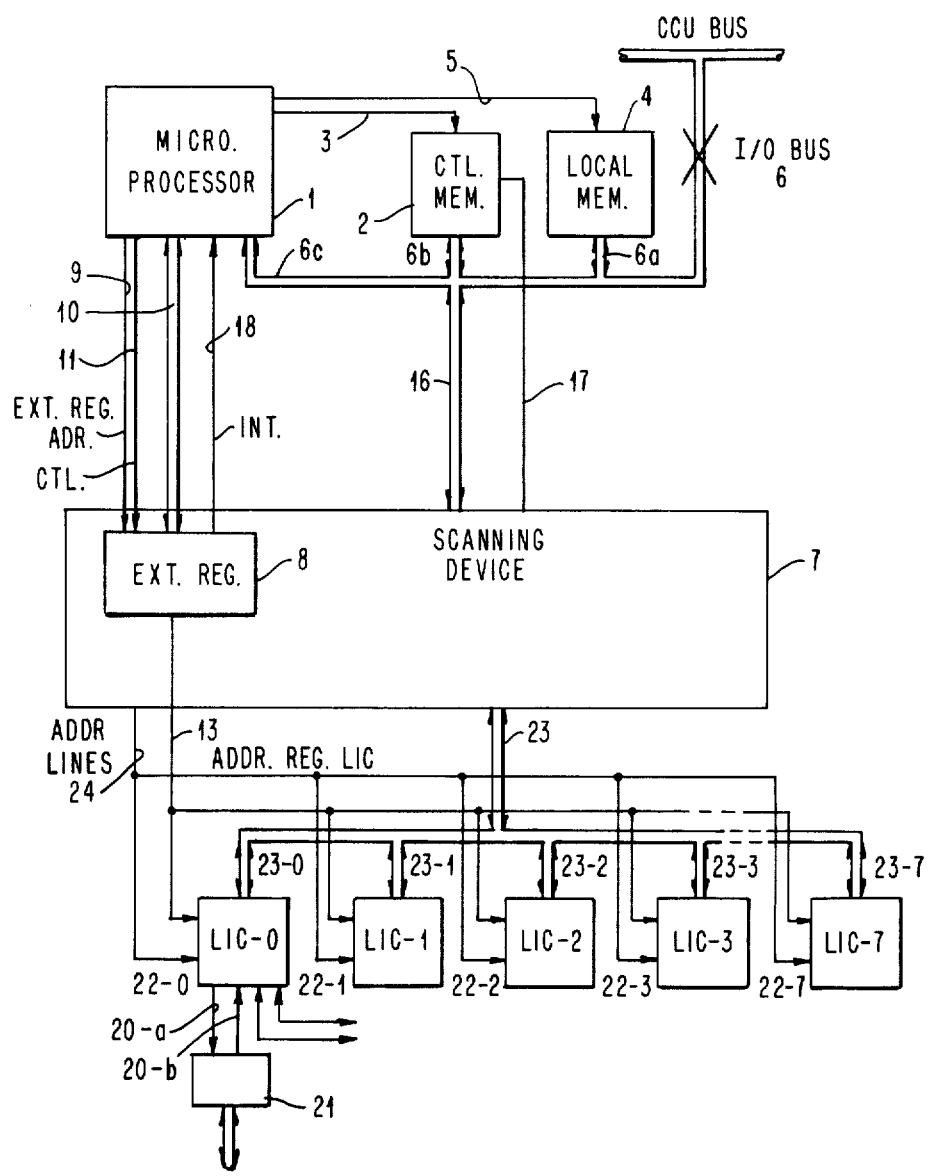
FIG. 2 illustrates one of the adapters of line LA shown on FIG. 1.

FIG. 2 is a schematic view of an adapter incorporating the address geerating device according to this invention. It comprises a microprocessor 1 associated to a control memory 2 with a free space for storing the microprocessor control microcode and a free space for storing data. This memory is addressed by the microprocessor through addressing path 3. The microprocessor is also associated to a local memory 4 which is addressed by said microprocessor through addressing path 5. Input/output bus I/O Bus 6 conveys information between bus CCU BUS of the teleprocessing system and the line adapter through program-initialized operations (PIO) and adapter-initialized operations (AIO). Bus 6 is connected to local memory 4 through a bus 6a, to the control memory through a bus 6b and to the microprocessor through a bus 6c.

Line scanning device 7 is connected to the microprocessor-memory assembly and is described in copending patent application Ser. No. 433,609 in the name of B. Brezzo and al and entitled: "A Communication Line Scanning Device for a Communication Controller" filed the same day as the present application and assigned to the same assignee.

External registers 8 can be addressed by the microprocessor through addressing path 9 and allow the microprocessor to communicate with device 7 through write and read operations performed in registers 8, under the control of control signals CTL on line 11. They are read or written by bus 10.

As described in the following, the scanning device includes amongst other elements, a storage arrangement in which areas are assigned to each line.

The scanning device communicates with storage 2 of the microprocessor in a so-called "Cycle Steal" mode in order to exchange information provided to or coming from lines to be scanned and a selected position of control memory 2. The data are exchanged through bus 16 and the memory is addressed through path 17. Interrupt path 18 is also provided to interrupt the microprocessor in certain conditions reported in one of the external registers.

The adapter is connected to the communication lines, one line being provided with two interfaces, a transmit interface and a receive interface 20a and 20b if said line is full duplex and with only one interface used either in receive mode or in transmit mode, if said line is half duplex, for receiving and transmitting the information towards the terminal, possibly through a modem 21. Line interface circuits LIC, 22-0 to 22-7 are located between scanning device 7 and the lines, five circuits are shown on the drawing. Up to 8 circuits can be provided in a preferred embodiment. These interface circuits are connected to scanning device 7 through buses 23-0 to 23-7, respectively. Each circuit includes line drive and receive circuits and registers for buffering the data bits which are received or to be transmitted on the lines connected thereto. The registers are addressed under the control of device 7, through addressing bus 13 and the lines connected to the LIC are addressed by address bus 24.

Therefore, in an assembly of this type, this invention relates to the line address generator allowing a line on which the scanning device is going to work, to be selected on each line scanning period.

Figure 3:
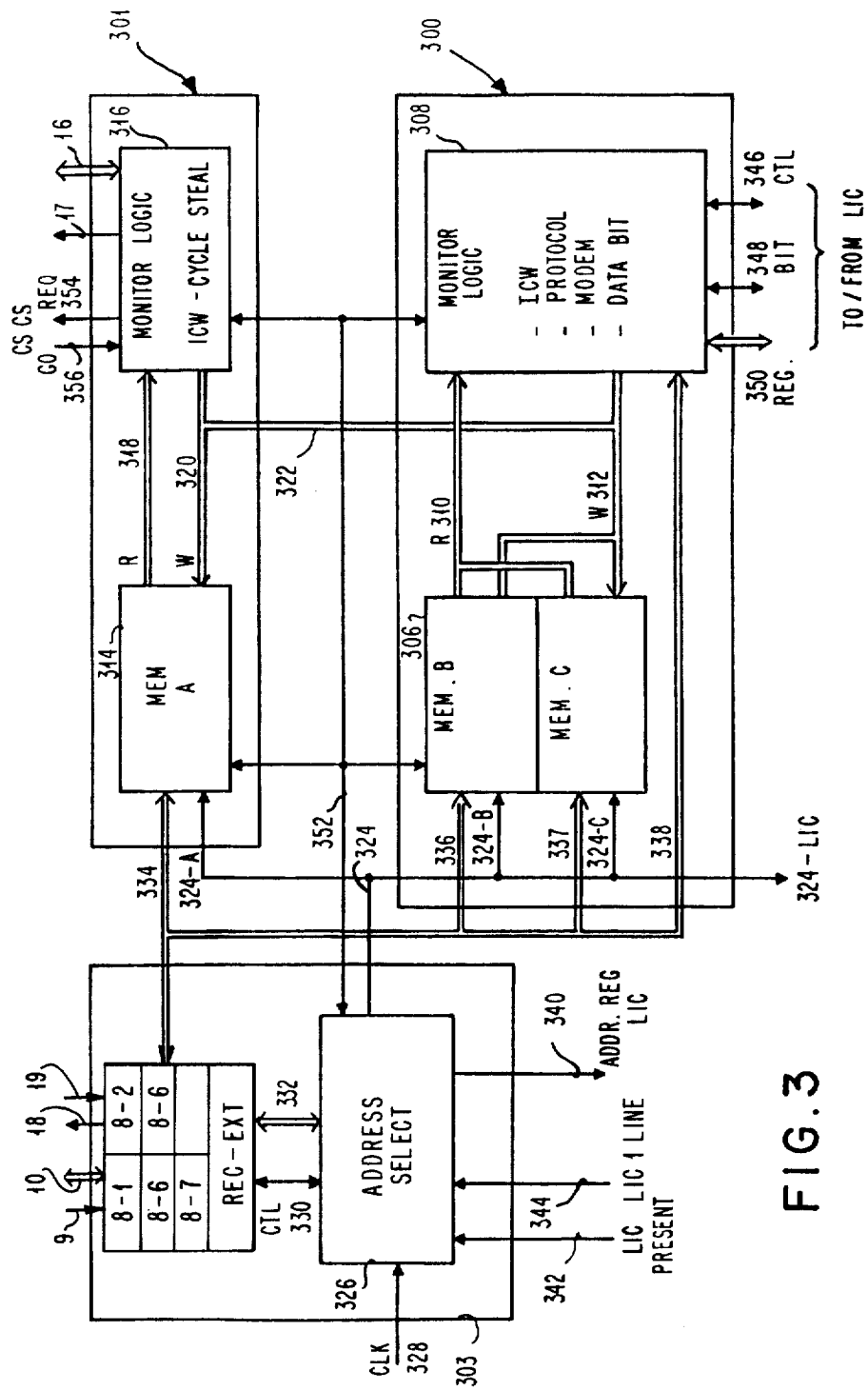
FIG. 3 illustrates scanning device 7 shown on FIG. 2.

Scanning device 7 which can use the address generator of this invention, is schematically shown on FIG. 3.

It is comprised of two data processing devices 300 and 301. First device 300 is connected to line interface circuits LIC 22 to deserialize and serialize the bits which are received and to be transmitted and to monitor the various transmission protocols in use and to process the control interface wires of the modems connected to the LIC. Second device 301 which is connected to microprocessor 1 of FIG. 2 through data bus 16 and addressing bus 17 assembles the characters into half-words and disassembles the half-words into characters and ensures the exchanges with the microprocessor memory in cycle steal mode. It arranges the data which are received or to be transmitted into the memory, provides the microprocessor with the status information resulting from the operations which have been performed and handles the interrupt requests for the microprocessor.

These two processing devices are controlled by control and addressing device 303.

Processor 300 includes an assembly 306 of two memories B and C which can be read and written in the same time and a monitoring logic circuit 308 which ensures the serialization/deserialization functions, controls the modems and monitors the various protocols in use. Under the control of read and write control signals (on line 352), it causes a location addressed by device 303 to be read and information read on bus R 310 to be transferred to a destination depending on the operation in progress, and data modified or not according to the type of operation, to be re-written in this same location through bus W 312.

Device 301 includes a memory A 314 and a monitoring logic circuit 316. As for device 301, reading and writting in the addressed locations of memory A 314, are controlled by signals on line 352, the read data being transferred through bus R 318 and the data to be written, through bus W 320.

Logic circuits 316 and 308 can cause memorieA, B and C to be written through line 322.

The address information is generated by device 303 on line 324, to address memories A, B and C and the lines on the LIC circuits through lines 324-A, 324-B, 324-C and 324-LIC. The addresses provided to the LIC circuit are the ones generated by the device of this invention.

Control and addressing device 303 comprises external registers 8 of microprocessor 1 which constitute the means allowing the microprocessor to communicate with scanning device 7, and an address select device 326. Device 326 controlled by a clock CLK 328 controls the sequential addressing of memories A, B and C in the normal scanning mode. This scanning can be interrupted by a control signal on line 330 transmitted by the microprocessor through an external register and the memories are addressed at this time from the information contained in one of external registers 8 through line 332. The data are transferred from external registers 8 to memories A, B and C through buses 334, 336 and 337 into the locations addressed by address select device 326. Bus 338 allows data to be transferred between the external registers and the registers located in the LIC circuits through logic circuit 308. The LIC circuit registers are addressed by circuit 326 and the addressing signal is generated on line 340. Lines 342 and 344 provide circuit 326 with signals indicating the presence of LIC circuits and their types, i.e. whether they permit or not to connect one single line or more to allow the scanning cycles to be adapted to the network configuration in accordance with this invention, in a manner which will be described later.

Logic circuit 308 communicates with the LIC circuits through control lines CTL 346, data bit exchange lines 348 and register transfer lines 350. A control line 352 allows controls to be sent to processing devices 300, 301, 303.

In a preferred embodiment, the scanning device allows 1 to 32 full duplex data transmission lines to be connected.

Scanning is sequentially carried out. The time interval between two line scans must be shorter than the time interval between two bits which are transmitted or received. The maximum scanning speed of the device of the invention is 350 000 received or transmitted bits per second (transmission through four wires also called "full duplex" transmission). This scanning power is automatically distributed amongst the number of connected lines. If there is one line, it would be able to operate at 256 000 bits per second. If there are four lines, they would be able to operate at 64 000 bits per second and if there are thirty two lines, they would be able to operate at 9600 bits per second. As said above, the lines are connected to scanning device 7 through interface circuits LIC 22. In a preferred embodiment, each LIC circuit can be connected to one or four lines. It is possible to have one to eight LIC circuits, each one being provided on a so-called LIC card and connected to a scanning device 7. The number of the LIC circuits which are connected, automatically modifies the line scanning. It is the function of lines 342 and 344. Line "LIC PRESENT" 342 allows circuit 303 to know the number of the LIC circuits which are installed, line "LIC 1 line" 344 indicates that the installed LIC circuit is connected to only one line. Therefore, the LIC circuits must be installed in the 0 to 7 order without empty interval. These lines condition the line scanning which is always performed in the following order. The first line (line 0) of the first LIC, the first line of the second LIC, etc., the first line of the last installed LIC, then the second line (line 1) of the first LIC, the second line of the third LIC, etc., the second line of the last installed LIC, then the third line (line 2) of the first LIC, etc., the third line of the last installed LIC and at last, the fourth line (line 3) of the first LIC, etc., the fourth line of the last installed LIC and we come back to the first line of the first LIC. If there is only one line on a LIC circuit, said one line will be scanned four times often as the other lines.

Figure 4:
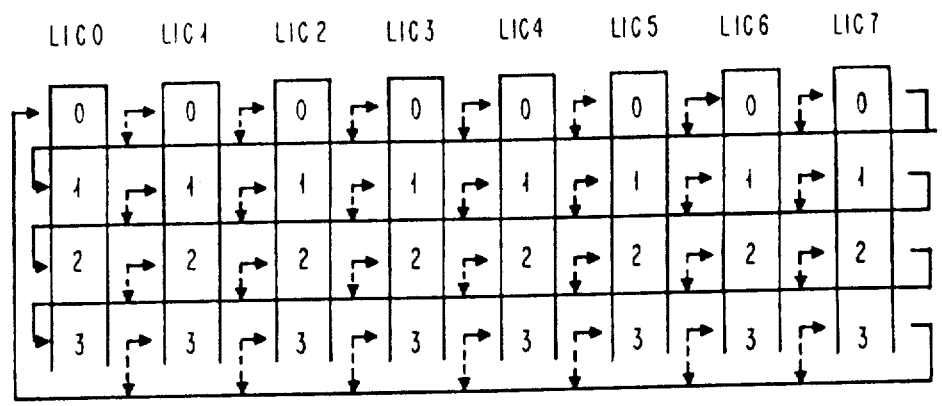
FIGS. 4 and 5 illustrate the line scanning diagram in two different network configurations.
Figure 5:
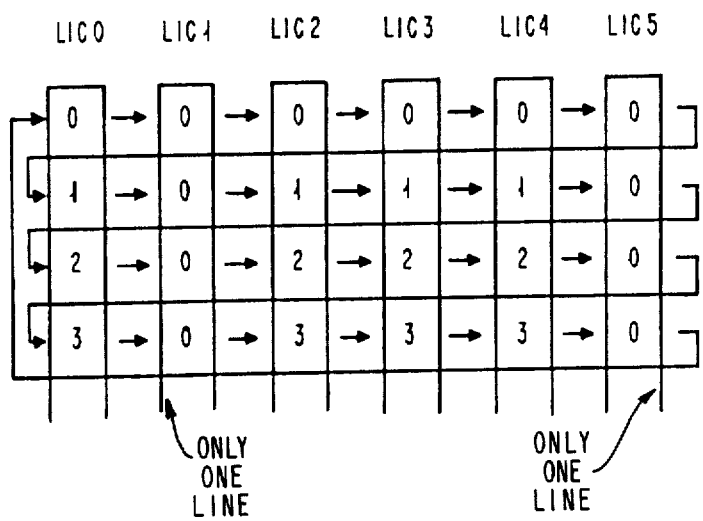

The scanning scheme is shown on FIGS. 4 and 5. FIG. 4 shows the scanning scheme when all LIC circuits 0 to 7 are connected to four lines (line 0 to line 3) and FIG. 5 shows the scanning scheme when there are 6 LIC circuits amongst which LIC circuits 1 and 5 are connected to only one line. Thus, it appears clearly that line 0 of LIC cards 1 to 5 is scanned four times more often.

This arrangement has been used in the preferred embodiment of the invention. It should be well understood that the number of the lines can be changed without departing from the scope of this invention.

FIG. 3 shows the control and address lines with a single wire as opposed to the data lines but it is obvious that the control lines can be provided with several wires, for instance each LIC circuit connected to circuit 7 is provided with a "LIC present" wire and a "LIC1 line" wire.

The works are optimally distributed amongst processing devices 300 and 301. For this purpose, processing device 300 operates at the bit-rate and device 301 operates at the character-rate (8 bit-byte), therefore eight time as slow as device 300.

Four registers of register assembly 8 are assigned to the management of the read or write access to the locations of memories A, B, C and into the LIC circuits.

First register 8-1 (bits 2 to 7+parity) is charged by the microprocessor control microcode to determine the line address (bits 2 to 6) and the interface type (bit 7=0 for a transmit interface and bit 7=1 for a receive interface).

Second register 8-2 (bit 0 to 7+parity) is the data intermediate register. In write mode, it is charged by the microcode with the data to be transferred. In read mode, the microcode can find the data to be read in this register, at the end of the operation.

Third register 8-3 (bits 0 to 5+parity) is charged by the microcode to specify the operation to be carried out (read or write, memory area to be accessed), and to trigger this operation at a time more particularly established to allow the data to be transferred without disturbing the synchronous operation in "cycle steal" mode of device 7.

Register 8-4 provides the condition of the access operation ensured by the microprocessor.

Registers 8-5 and 8-6 constitute the interrupt registers. When the scanning device sends an interrupt to the microprocessor, it loads these registers to provide the required information relating to the interrupt, to the microcode.

The address of the interface which has required the interrupt is located in register 8-5. The cause of the interrupt can be found in register 8-6.

Figure 6:
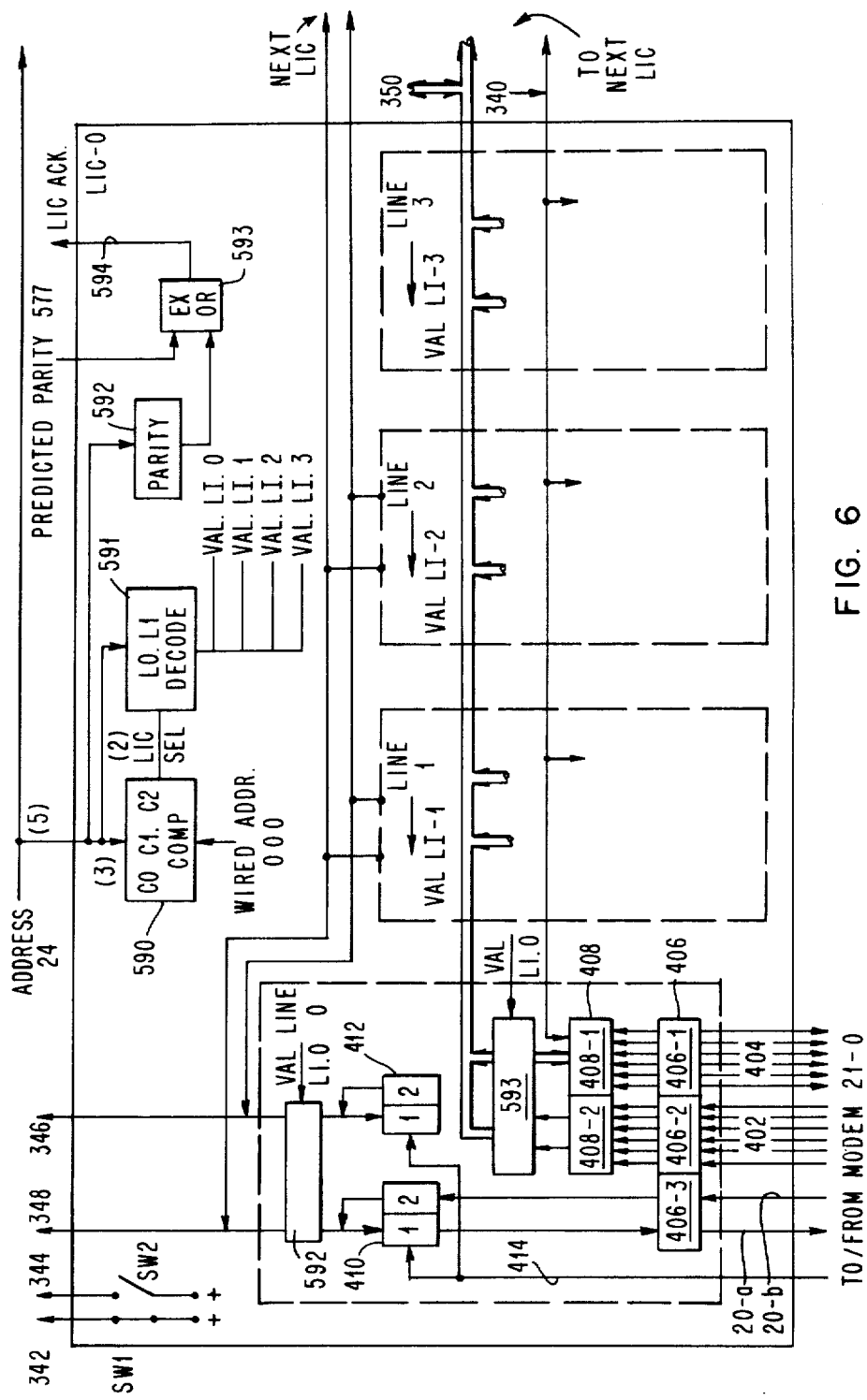
FIG. 6 is a schematic view of a line interface circuit LIC.

Before proceeding to the description of the operation of the address generating unit of the invention, one will refer to FIG. 6 for a description of the general scheme of a LIC interface circuit.

FIG. 6 illustrates one of the interface circuits LIC.0 to which four transmission lines are connected through modems 21-0 to 21-3. These circuits are provided on a card and in the following either of the terms "LIC circuits" or "LIC cards" will be indifferently used.

Only the circuit relating to line 0 connecting modem 21-0 and the scanning device, will be described in the following, said circuit being the same for all the modems.

The data bits are provided to the modem through transmit interface 20-a and are received from the modem by the scanning device through the receive interface 20-b. Two sets of control wires 402 and 404 allow the control signals associated to the interfaces to be exchanged, said signals being specified by the various standards. Wires 20-a and 20-b, 402 and 404 are connected to a receiver/drive circuits assembly 406. Receivers 406-2 receive control signals 402 and drive circuits 406-1 send signals 404 to the modem. Circuit 406-3 includes a receiver for interface wire 20-b and a drive circuit for interface wire 20-a.

Registers 408-1 and 408-2 are the LIC registers which can be addressed by address line 340. Register 408-2 receives information from receivers 406-2 which corresponds to the "input modem" configuration and it can be read and its contents can be transmitted to scanning device 7 through bus 350 common to all LIC circuits. Register 408-1 transmits the output modem configuration information to wires 404 through drive circuits 406-1. It can be written and read by the scanning device through bus 350.

Two latches 410-1 and 410-2 are set by the clock of modem H or an external clock for the lines which are not connected to a modem on line 414 in order to store the bits to be transmitted and the bits received at bit-time. The bit to be transmitted is issued from line 348 and stored into latch 410-1 and the bit received is issued from interface 20-b and is stored into latch 410-2. It is transmitted to the scanning device through line 348.

Two service latches 412-1 and 412-2 are associated to latches 410-1 and 410-2. Latches 412-1 and 412-2 are set by the modem clock when a bit is applied into latches 410 to indicate that a bit is ready to be received or sent and they are reset by the scanning device when these bits have been processed. These latches provide the CTL bit service control signals on line 346.

Each LIC card bears two indications "LIC present" and "LIC1 line" on wires 342 and 344. High level signals are generated on these lines by means of switches SW1 and SW2 connecting these lines to a positive voltage when the LIC card is present in the network and when this card is connected to only one line.

An address decode circuit is provided on each LIC card and comprises a comparator COMP. 590 which receives the LIC address generated by address select device 326 in a way which will be described with reference to FIG. 9 and the LIC wired address, for instance 000 for LIC 0. It outputs a selected LIC signal LIC SEL when the comparator detects an equality. A decode circuit 591 receives the line address bits on LIC L0 and L1 (generated by the circuit of FIG. 9) and provides line address validation signals VAL LI.0, VAL LI.1, . . . , VAL LI.3.

Two gate circuits 592 and 593 are provided and open by validation signals VAL LI.0 for line 0 of the card, when this line is scanned in order to allow the information to be transferred between lines 348–346 and latches 410, 412 and between register 408 and bus 350.

Circuit 592 computes the parity of the received address and this calculated parity is compared with the predicted parity (output 577 of the circuit shown on FIG. 9) in exclusive OR circuit 593 wich generates the "LIC error" or "LIC no error" LIC ACK information at its output 594.

Figure 7:
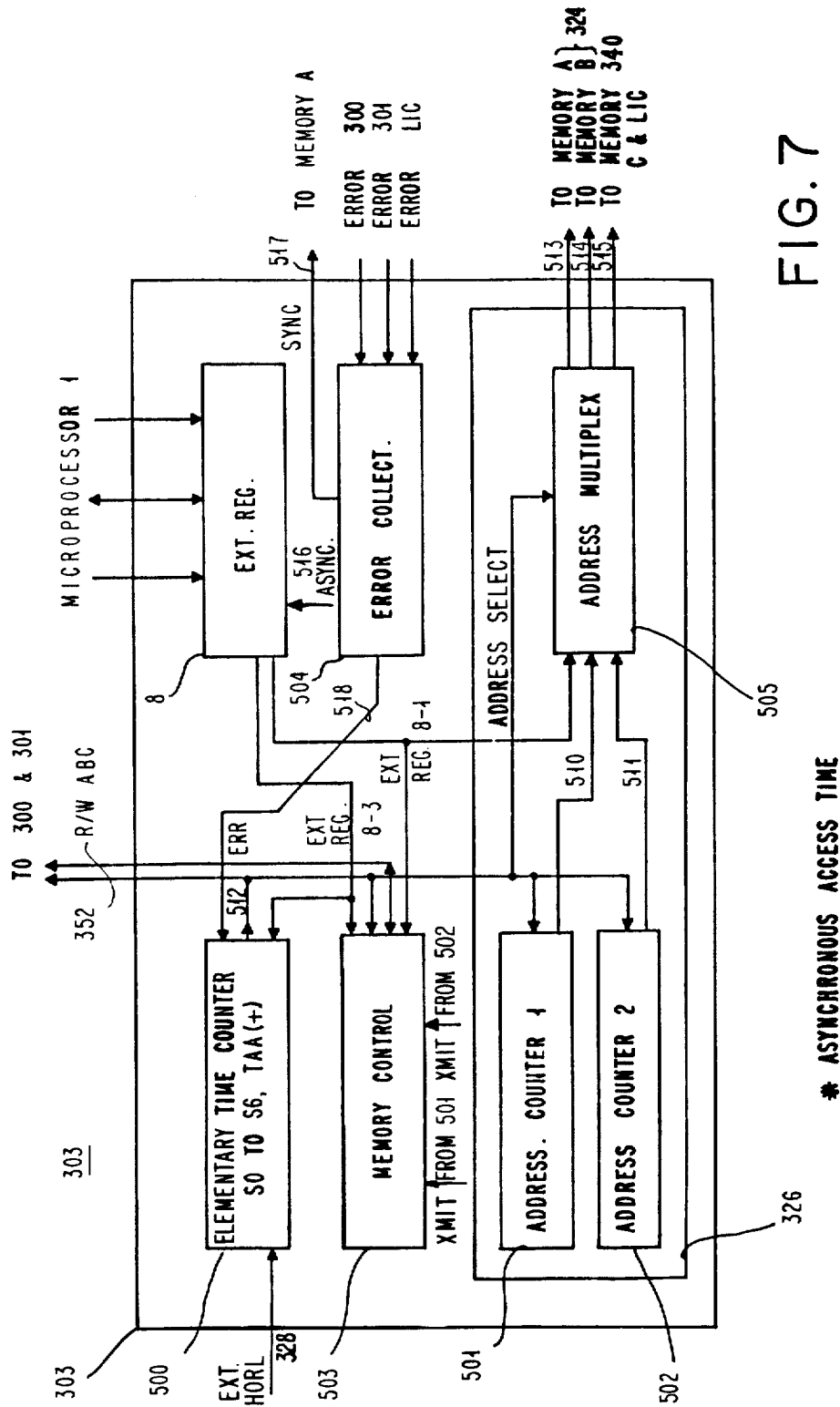
FIG. 7 illustrates addressing and control device 303 of FIG. 3.

The address and control device will be now described while referring to FIG. 7.

It includes external registers 8 as defined with reference to FIG. 3 the function of which is to ensure communication between the microprocessor and the scanning device and address select device 326 in charge of addressing memories A B C and providing the line addresses either during the sequential scanning of these lines, or during an asynchronous operation of the microprocessor to access to a memory A, B or C or to a register of the LIC interface circuits.

In addition, device 303 contains a time counter 500 for generating elementary times S0 to S6 in this particular embodiment, from an external clock, these times being used by devices 300 and 301 to clock their operations.

Address select device 326 is synchronous with time counter 500. It contains itself two time counters 501 and 502 which are called "address counters" 1 and 2. Address counter 1 501 generates the scanning addresses provided for device 300 and the LIC interface circuits. These addresses remain stable during the period between S0 and S6 included, said period being assigned to the operation of device 300 on a line interface, then the counter is incremented to be switched to the next interface in accordance with the scanning process described with reference to FIGS. 4 and 5.

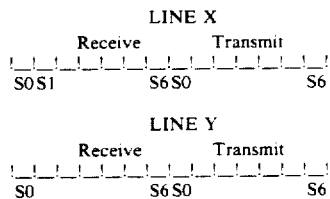

Address counters 2, 502 generate the scanning addresses provided for device 301. These addresses increment exactly as the ones provided by counter 501 but 4 to 8 times slower in function of the operation to be performed by device 301, which means that the addresses of the lines on which devices 300 and 301 operate, are generally different.

From elementary times S0 to S6, device 301 determines operation steps P0 to P3 and the scanning address remains fixed all along these steps in order to allow device 301 to perform its job on a given interface.

After step P3, one comes back to P0 and the counter is incremented to be switched to the next interface which can be the transmit interface of the same line or the receive interface of the next line.

Before starting scanning as controlled by the microprocessor, counters 501 and 502 are set to zero, which means that scanning will begin with the receive interface of line 0 of circuit LIC 0. The addresses of the successive lines to be scanned are generated by counter 501.

When one of the counters reaches the value of the last address to be scanned, the next increment brings it back to the address of the first line.

The means allowing this operation to be carried out will be described later while referring to FIGS. 9 and 10.

The addresses generated by counters 501 and 502 on address buses 510 and 511 get into an address multiplexing device the function of which is to provide the addresses to devices 300 and 301 and to the LIC interface circuits, taking into account elementary times S0 to S6 provided on line 512 by counter 500.

In general, device 300 receives the addresses of counter 501 for its memories B and C and device 301 receives the address of counter 502 for its memory A. But in order to allow a communication to be ensured between devices 300 and 301 on certain fixed elementary times, memory A receives the addresses of counter 501 to allow it to be accessed by device 300 and memory B receives the addresses of counter 502 to allow it to be accessed by device 301.

The addresses provided to memory C and to the LIC interface circuits by device 505 are always the ones of counter 501.

Circuit 505 is provided with three outputs: output 513 for addressing memory A, output 514 for addressing memory B and output 515 for addressing memory C and the LIC circuits.

Address select device 326 is in relation with microprocessor 1 through external register 8-1. When the microprocessor operates in an asynchronous mode to access to a memory or to a LIC circuit, the microprocessor loads the address of the interface on which the operation is to be carried out, into register 8-1. During the execution of the operation, this address is substituted for the addresses of address counters 501 and 502 and is simultaneously delivered to devices 300 and 301 and LIC by address multiplexing circuit 505. The synchronous operation of scanning device 7 is suspended for the duration of the microprocessor operation. Asynchronous access time TAA is generated by the elementary time counter only when the microprocessor performs a read or write operation on a memory A, B, C or on a LIC circuit register. The operation is triggered by the loading of register 8-3 by the microprocessor. Time TAA is intercalated between next encountered time S6 and following time S0. Therefore, it causes a slow down of counters 501 and 502 scanning speed but this speed has been chosen high enough to permit a plurality of accesses without reducing the performance of scanning device 7.

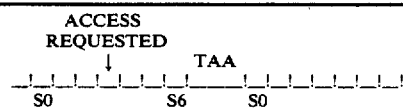

In addition to the line addresses, memories A, B, C receive from device 303, select controls and read and write controls (CTL 352 on FIG. 3) elaborated by the control device of memories 503 in function of elementary times S0 to S6 which define the synchronous operations to be executed by devices 300 and 301, and of XMIT signals which, when at level 1, indicate that the scanned interface is a transmit interface and are elaborated by the address counters.

During time TAA, these controls are issued from the contents of external register 8-3 previously loaded by the microprocessor.

Another element of device 303 is error collect device 504 which is provided to centralize all the error information which can be detected by device 7 and to provide said information to the microprocessor.

Figure 8:
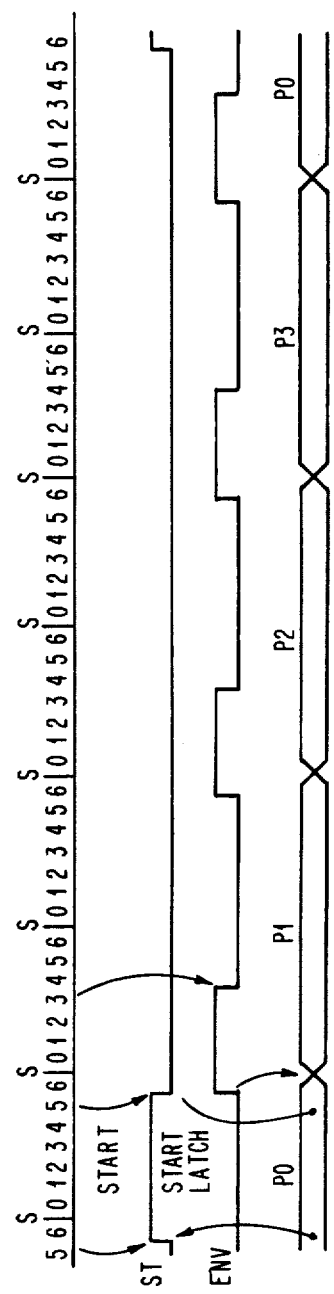
FIG. 8 illustrates the time diagram of device 301.

FIG. 8 shows the time diagram relating to the operation of device 301 which can be repeated up to eight times for each interface scan. First the receive interface is scanned, then the transmit interface.

A start pulse informs the address selector that device 301 is ready to operate.

A so called "Enveloppe ENV" pulse ensures the synchronization after a cycle steal step with the microprocessor and the discrimination between an operation step in device 301 and an information exchange step with the microprocessor, to be made.

Device 7 and circuit 303 have been described only as an example to show how the address generating device according to the invention may be used in a particular environment.

It should be understood that this address generating device could be used with any type of scanning device requiring an addressing of the lines.

Figure 9:
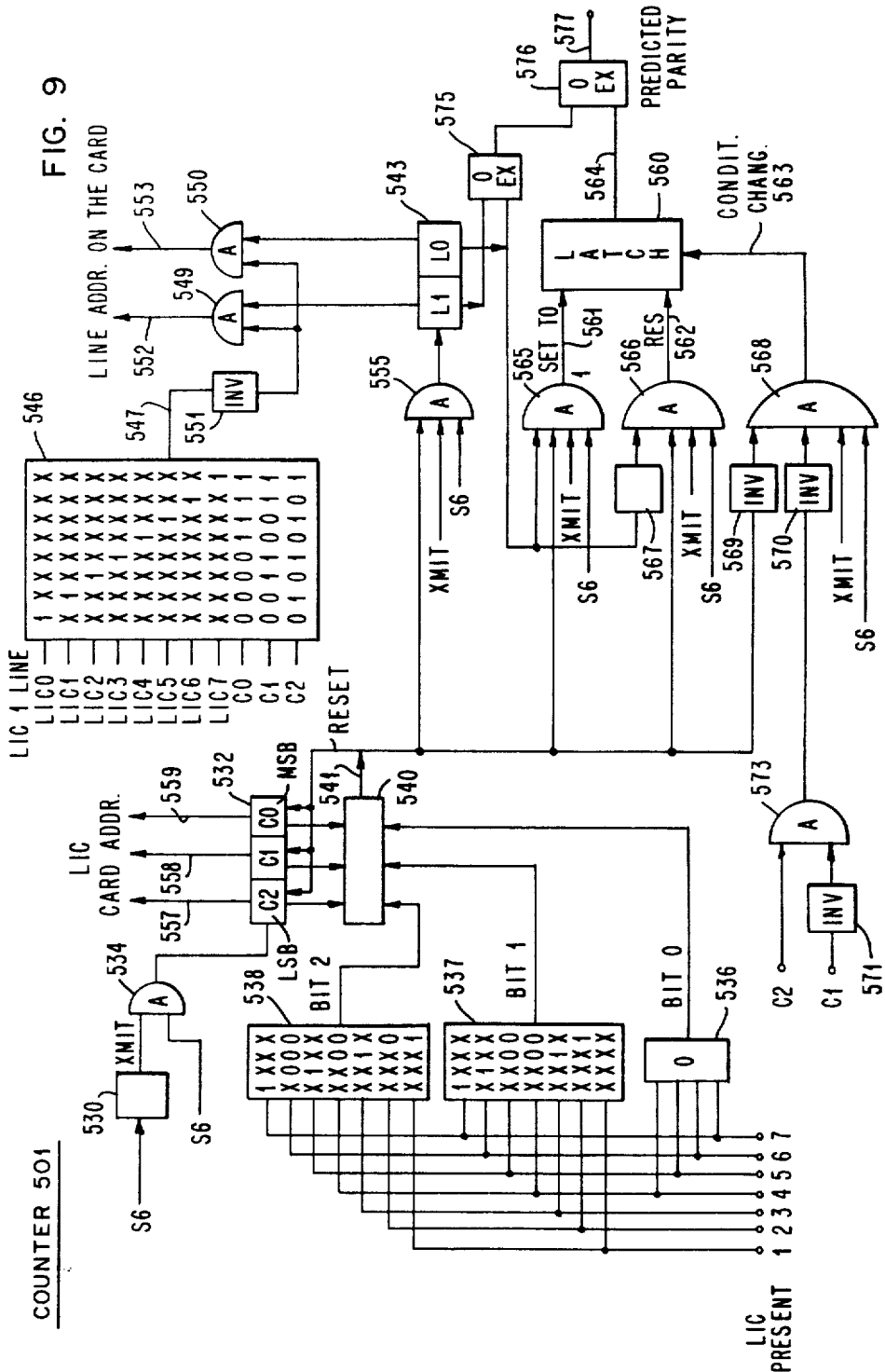
FIG. 9 illustrates line address counter 501 of FIG. 7.

FIG. 9 describes address counter 501 which generates the line addresses. It is assumed that the network configuration comprises eight LIC cards for each adapter, said cards being connected to a maximum of four lines. It is obvious that other configurations could be contemplated. In this case, the number of stages of the card and line counters would have to be changed.

Counter 501 comprises a receive/transmit latch 530, a card counter 532 and a line counter 543. The receive/transmit latch is set to "0" in receive mode and to "1" in transmit mode. When starting the scanning operation, it is set to 0 since the operation begins always by scanning a receive interface. It is reset to zero by the general resetting to zero of the machine. Its condition is changed on each pulse S6 provided by the elementary time counter on line 512 (FIG. 7). Therefore, at the end of the scanning operation performed on each interface, its condition is changed to be switched from receive mode to transmit mode or from transmit mode to receive mode.

Card counter 532 comprises 3 bits C0, C1, C2. C2 being the least significant bit LSB and C0, the most significant bit MSB. The function of this counter is to provide the portion of the address which points out the LIC cards. When LIC cards LIC 0 to LIC 7 are installed, this counter counts up to the 111 binary value to point out the eighth card, then it is automatically reset to 0 on the next incrementation.

It is incremented through AND gate 534 which is set by the output of latch 530 and pulse S6. Thus, it is incremented when the receive and transmit interfaces of a line have been scanned, to address the following card.

When there are less than eight LIC cards installed, the contents of the card counter is automatically limited to the address of the last card installed, through the logic circuit comprising OR circuit 536 and two logic circuits 537 and 538.

Information "last card installed" is coded on three bits: bit 0 at the output of circuit 536, bit 1 at the output of circuit 537 and bit 2 at the output of circuit 538. These bits are coded as follows:

| Bit 0 | Bit 1 | Bit 2 | Last Card Installed |
|---|---|---|---|
| 0 | 0 | 0 | LIC 0 (last card installed) |
| 0 | 0 | 1 | LIC 1 |
| 0 | 1 | 0 | LIC 2 |
| 0 | 1 | 1 | LIC 3 |
| 1 | 0 | 0 | LIC 4 |
| 1 | 0 | 1 | LIC 5 |
| 1 | 1 | 0 | LIC 6 |

| Bit 0 | Bit 1 | Bit 2 | Last Card Installed |
|---|---|---|---|
| 1 | 1 | 1 | LIC 7 |

Logic circuit 536, 537, 538 uses signal "LIC present" on line 342 of each LIC, LIC 1 to LIC 7. Signal "LIC present" of card LIC 0 is not taken into account by the logic since it is assumed that card LIC 0 is always present. Signal "LIC present" of a LIC card goes automatically to the up level when this card is connected to the machine.

OR circuit 536 receives signals "LIC 7 present", "LIC 6 present", "LIC 5 present", "LIC 4 present". Therefore, it provides the 0 bit. Circuits 537 and 538 are AND, OR, INVERT (AOI) assemblies. Circuit 537 provides "bit 1" at "1" as output signal:

Card LIC 7 is present, or card LIC 6, or card LIC 5 is absent as well as LIC 4, and LIC 3 is present, or card LIC 5 is absent as well as LIC 4 and LIC 2 is present, as schematically shown in circuit 537.

Figure 10:
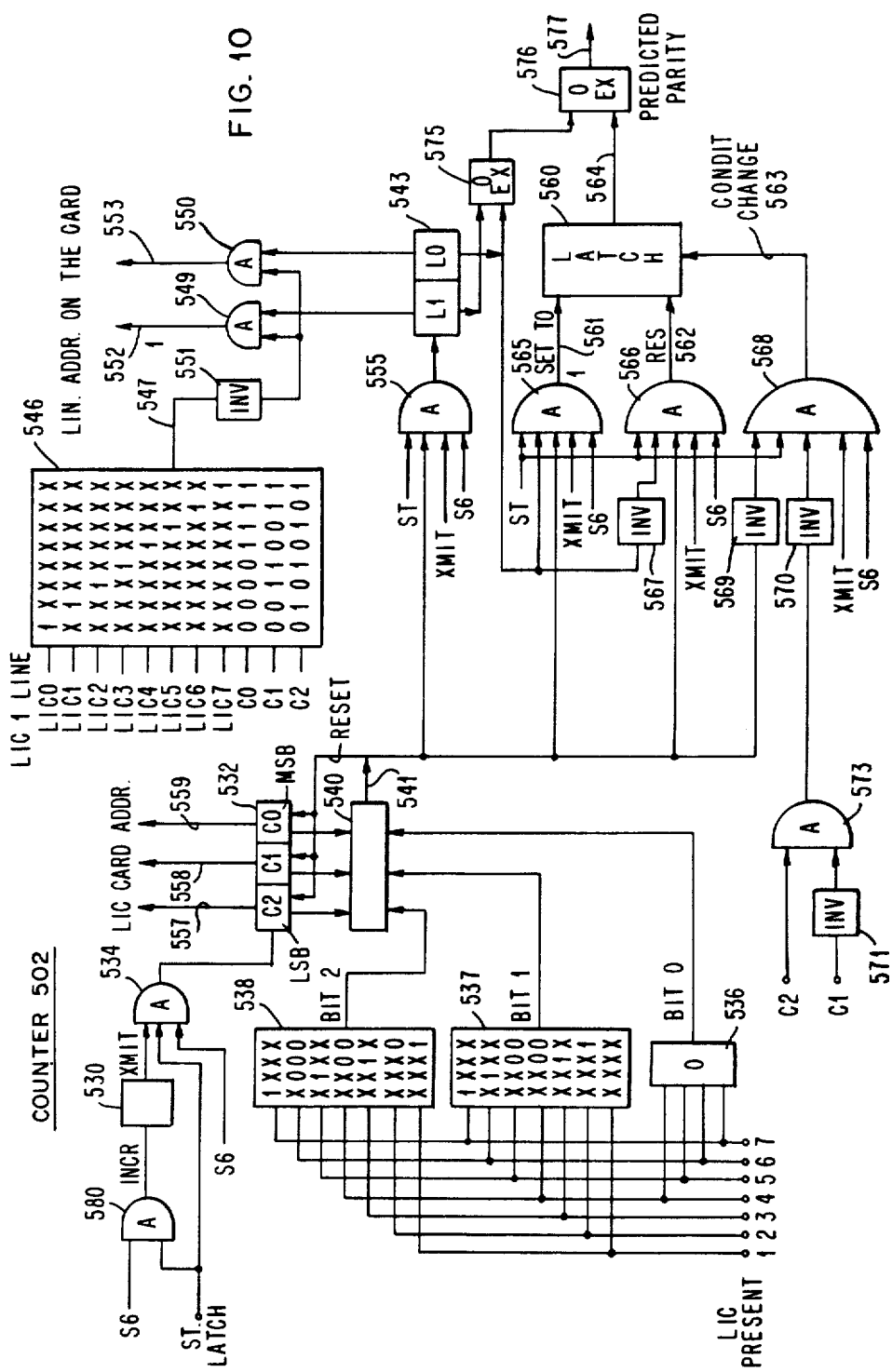
FIG. 10 illustrates address counter 502 of FIG. 7.

In the schematic drawings of FIGS. 9 and 10, X means 1 or 0, i.e. don't care. Circuit 537 ensures an AND operation on the signals of the various columns with the indicated values and a OR operation between the various columns.

Circuit 538 provides bit 2 at "1" as output signal when card LIC 7 is present or LIC 6 is absent and LIC 5 is present, or LIC 6 is absent as well as LIC 4 and LIC 3 is present, or LIC 6 is absent as well as LIC 4 as well as LIC 2 and LIC 1 is present.

The contents of counter 532 is compared to information "last card installed" by comparator 540. When an equality is detected, the comparator generates information "last card scanned" on output line 541.

In this case, and when the receive/transmit latch is in the transmit condition, on next pulse S6, the counter is reset to 0 by its reset control provided by output 541.

Line counter 543 comprises two bits L0 and L1 and provides the portion of the address which points out a line of the card selected by the card counter.

Line counter systematically counts up to the 11 binary value, then it automatically goes back to 00. Thus, it scans the four lines of a LIC card when the latter is not a card "LIC 1 line".

If this card is a "LIC 1 line" as indicated by a signal on line 344 (FIG. 6), the address of this line should be 00.

A logic circuit 546 detects that the scanned card is provided with only one line and generates information "card 1 line" scanned on line 547.

Circuit 546 receives card address information C2, C1, C0 and information "LIC 1 line". It provides a signal at its output 547 at the 1 level, when the scanned card (LIC 0 to LIC 7), the address of which is defined by address bits C2 to C0, comprises only one line. The same references and marks as the ones used for circuits 538 and 537 have been used in this case.

Information "card 1 line scanned" on line 547 is used to erase bits L0 and L1 at the output of line counter 543 by means of AND gates 549 and 550.

The AND gates are set by output 547 inverted by inverter 551. They transmit the contents of counter 543 on output lines "line Address on Card" 552 and 553, when the scanned card is not a card 1 line. In the opposite case, output lines 552 and 553 are at the 0 level.

Line counter 543 is incremented through AND gate 555 set by information "last card scanned" on line 541 and by pulse S6 when output signal XMIT of latch 530 is at the 1 level, which indicates that the scanning of the transmit interface is completed and that we are going to scan the receive interface of the following line.

The assembly comprises a parity prediction circuit which continuously checks the proper operation of the address counter.

This circuit determines, on each incrementation, the value to be taken by the parity of the address bus comprising output lines 557, 558, 559 of counter 532, and lines 552 and 553.

In case of defective operation of the counter leading, for instance, to the generation of an incorrect address bit, the parity calculated from the address bits, will not correspond to the predicted parity and it will be possible to detect the defect. The correct operation of address counter 501 is checked by the LIC circuits in a way to be explained later.

The parity prediction circuit is designed from the following remarks:

PARITY 3 OF CARD COUNTER 532
(for a given value of the line counter)

| C0 | C1 | C2 | P | |
|---|---|---|---|---|
| 0 | 0 | 0 | 1 | Initial Condition |
| 0 | 0 | 1 | 0 | ← Parity does not change |
| 0 | 1 | 0 | 0 | |
| 0 | 1 | 1 | 1 | |
| 1 | 0 | 0 | 0 | |
| 1 | 0 | 1 | 1 | ← Parity does not change |
| 1 | 1 | 0 | 1 | |
| 1 | 1 | 1 | 0 | |

On each incrementation, the value of the parity is changed except when $C1=0$ and $C2=1$.

LINE ADDRESS PARITY
and Line Counters 532 and 543

| L0 | L1 | C1 | C1 | C2 | P | |
|---|---|---|---|---|---|---|
| 0 | 0 | 0 | 0 | 0 | 1 | Initital Condition |
| 0 | 0 | 0 | 0 | 1 | 0 | |
| 0 | 0 | 0 | 1 | 0 | 0 | |
| ↓ | ↓ | | etc | | | |
| 0 | 0 | | Last Card Installed | | | |
| Incrementation | | Resetting to Zero | | | | Parity Prediction |
| 0 | 1 | 0 | 0 | 0 | 0 | |
| 0 | 1 | 0 | 0 | 1 | 1 | |
| ↓ | ↓ | | etc | | | |
| 0 | 1 | | Last Card Installed | | | |
| Incrementation | | Resetting to Zero | | | | |
| 1 | 0 | 0 | 0 | 0 | 0 | |
| 1 | 0 | 0 | 0 | 1 | 1 | |
| ↓ | ↓ | | etc | | | |
| 1 | 0 | | Last Card Installed | | | |
| Incrementation | | | | | | |
| 1 | 1 | 0 | 0 | 0 | 1 | |
| 1 | 1 | 0 | 0 | 1 | 0 | |
| ↓ | ↓ | | etc | | | |
| 1 | 1 | | Last Card Installed | | | |

Return to Initial Condition

As shown on the preceding tables, for a given value of the line counter, the value of the parity is changed on each incrementation of the card counter except when C1=0 and C2=1.

When the card counter reaches the value corresponding to the last LIC installed, the next incrementation resets it to 0, increments the line counter and sets the parity to a value depending on the previous condition.

If L0=0, the new parity is 0
If L0=1, the new parity is 1

When the card counter points out a card "1 line", the resetting to zero of the line counter output through AND gates 549 and 550 requires the correction of the predicted parity. In this case:

If L1=L0, the parity is unchanged
If L1≠L0, the parity is inverted.

The parity predict circuit comprises a parity predict latch 560 which can be set to 1 by a signal applied to its input 561 and reset to zero by a signal applied to its input RAZ 562. A signal applied to its input "Condition changed" 563 causes the condition of its output signal on line 564 to be changed.

When starting the machine, all the counters are reset to zero and the parity latch is set to 1. During the scanning operation, latch 560 is set to 1 by AND circuit 565 which is set on when L0=1, when the last card installed is detected (line 541 at 1) when the incrementation is performed (XMIT and S6 at 1).

It is set to 0 by AND circuit 566 which is set on when L0=0 through inverter 567, when the last card installed is detected and when the incrementation is performed (XMIT and S6 at 1).

And circuit 568 controls the change of the status of latch 560 during the scanning operation performed on the cards according to the value of the line counter. It is used to prevent the status change of latch 560 from being performed when C1=0 and C2=1. Gate 568 receives as inputs signal "last line scanned" inverted by inverted 569, signals XMIT and S6 and the output inverted by inverter 570, of AND circuit 573 which is set on when C2=1 and C1=0. C1 is applied to AND circuit 573 by inverter 571.

Condition L1≠L0 is detected by exclusive OR circuit 575 and the parity detected at output 564, in this case, is inverted by exclusive OR circuit 576.

The parity indication is provided by circuit 576 on its output 577.

Therefore, the logic allows the parity to be predicted during the scanning operation in accordance with the preceding tables.

As shown on FIG. 6, in each LIC, comparator 590 receives, on the one hand, the address of LIC C0, C1, C2 and on the other hand, the wired address of the LIC. Decode circuit 591 receives ligne address L0, L1.

The validation signals are at the 1 level in the following conditions:

| L0 | L1 | VALIDATION |
|----|----|-----------|
| 0  | 0  | VAL LI.0  |
| 0  | 1  | VAL LI.1  |
| 1  | 0  | VAL LI.2  |
| 1  | 1  | VAL LI.3  |

Counter 502 comprises the same elements as counter 501. Therefore, it is shown on FIG. 10 with the same elements bearing the same references. The increment circuit is modified.

Receive/transmit latch 530 which, in the initial condition, is at 0, is incremented when starting pulse ST is at the high level, at time S6, through AND circuit 580.

AND gate 534 is set by the starting pulse, S6 and XMIT. An additional condition is added to AND gates 565, 566 and 568, namely ST=1.

Thus, the address provided by counter 502 and used for addressing memory A in device 301 is incremented slower than the address provided by counter 501, since the incrementation of counter 502 is controlled by starting pulse ST.

We claim:

1. In a device for scanning communication lines, said communication lines being used for exchanging message bits and connected to the scanning device through n line interface circuits, n varying in accordance with the configuration of the line network, an address generating device characterized in that it includes:
   a first logic circuit (536, 537, 538) receiving presence indicating signals provided by the interface circuits when they are connected to the scanning device, said logic circuit outputting the address bits of the last present interface circuit to be scanned,
   a clock providing an increment pulse on each period assigned to a line scan,
   a first counter (532) which is incremented by each increment pulse and which can count in binary mode up to n−1, to output the address bits of the successive interface circuits,
   a first comparator (540) receiving at a first input, the output of the first logic circuit and at its second input, the output of the first counter and which outputs a reset signal of the first counter when the first and second inputs are equal.

2. A device as set forth in claim 1 characterized in that each interface circuit is connected to a variable number of lines equal to k or a sub-multiple of k and comprises means (SW2) for generating a signal indicating the number of lines.

3. A device as set forth in claim 1 or 2 characterized in that the address generating unit comprises a logic circuit (546) receiving as an input, the interface circuit address bits generated by the first counter and the signals indicating the number of lines issued from the interface circuits to output a signal which is active to indicate the number of lines connected to the interface circuit addressed by the first counter,
   a second counter (543) able to count up to k−1, which is incremented by the reset signal provided by first comparator (540) to output line address bits which, with the interface address bits, constitute the line address information on the outputs of address generator (557, 558, 532, 552, 553),
   inhibiting means to allow the address bits provided by the second counter, to be modified on the outputs of the address generator when the line interface circuit is not connected to maximum number k of lines.

4. A device as set forth in claim 3 characterized in that the number of lines which can be connected to each interface circuit is of 1 or k.

5. A device as set forth in claim 4 characterized in that the inhibiting means comprises AND logic circuits receiving as an input, the line address bits provided by the second counter and the inhibiting signal provided by the second logic circuit to make the line address bits equal to zero when the interface circuit is connected to only one line.

6. A device as set forth in anyone of the previous claims characterized in that each line comprises a receive interface (20-b) and a transmit interface (20-a), the scanning period of a line being divided into a half-period for scanning the receive interface followed by a half period for scanning the transmit interface.

7. A device as set forth in claim 6 characterized in that it comprises means (530, 534) for applying the increment pulse of the first counter at the end of the second half-scanning period of the transmit interface.

8. A device as set forth in claim 6 or 7 characterized in that each interface circuit comprises k latches (410-2), the bit received from the line being stored into each one of said latches on each bit time, and k transmit latches (410-1), the bit to be sent on the line being stored into each one of said transmit latches on each bit time, an address decode circuit (590, 591) the inputs of which receive the line address information generated at the outputs of the first and second counters and the outputs of which provide validation signals for the lines which are connected to the interface circuit, each line valid signal being active when the decode circuit has decoded the address of a particular line, k gating circuits (592) which are connected to the transmit and receive latches on the one hand and to the scanning circuit on the other hand, each of said transfer circuits receiving a line validation signal, said signal in active condition allowing message bits to be exchanged between the transmit and receive latches and the scanning device.

9. A device as set forth in anyone of claims 2 to 8, characterized in that it includes a parity prediction circuit (560 to 576) comprising:

a third logic circuit (565, 566, 568, 573) provided with inputs receiving the output of the first comparator (540) and selected line and interface circuit address bits, and three outputs, a parity prediction latch (560) provided with three inputs, a first input for setting said latch to 1, a second input for setting said latch to 0 and a third input for changing the condition of said latch, each of said input being connected to one of the outputs of the third logic circuit, and an output, and a parity correcting circuit (575, 576) receiving the output of the parity latch and the line address bits to change the parity value on the output of the latch when two bits are different amongst the line address bits.

* * * * *